US008285294B2

(12) United States Patent
Baldemair et al.

(10) Patent No.: US 8,285,294 B2
(45) Date of Patent: Oct. 9, 2012

(54) TECHNIQUE FOR PERFORMING A RANDOM ACCESS PROCEDURE OVER A RADIO INTERFACE

(75) Inventors: Robert Baldemair, Solna (SE); Maria Edvardsson, Järfälla (SE); Erik Dahlman, Bromma (SE); Jacobus Cornelis Haartsen, BG Hardenberg (NL); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 12/083,911

(22) PCT Filed: Oct. 20, 2006

(86) PCT No.: PCT/EP2006/010162
§ 371 (c)(1),
(2), (4) Date: Dec. 17, 2010

(87) PCT Pub. No.: WO2007/045504
PCT Pub. Date: Apr. 26, 2007

(65) Prior Publication Data
US 2009/0215450 A1    Aug. 27, 2009

(30) Foreign Application Priority Data
Oct. 21, 2005    (SE) ....................................... 0502348

(51) Int. Cl.
*H04W 72/00*    (2009.01)
(52) U.S. Cl. ..... 455/450; 455/434; 455/517; 455/435.1; 455/452.1; 370/313; 370/468; 370/331; 370/329
(58) Field of Classification Search .................. 455/434, 455/517, 435.1, 450, 452.1; 370/313, 468, 370/331, 329
See application file for complete search history.

(56) References Cited

U.S. PATENT DOCUMENTS

| 6,144,653 | A  | * | 11/2000 | Persson et al. | 370/337 |
| 6,757,293 | B1 | * | 6/2004 | Chuah et al. | 370/432 |
| 6,865,165 | B1 | * | 3/2005 | Huttunen | 370/329 |
| 2002/0089957 | A1 | * | 7/2002 | Viero | 370/336 |

FOREIGN PATENT DOCUMENTS

| WO | 00/13378 A2 | 3/2000 |
| WO | WO 00/13378 | 9/2000 |
| WO | 00/74416 A | 12/2000 |
| WO | 01/47314 A2 | 6/2001 |

OTHER PUBLICATIONS

Translation of Russian official action, Sep. 2, 2010, in corresponding Russian application No. 2008119997.

(Continued)

*Primary Examiner* — Kwasi Karikari
(74) *Attorney, Agent, or Firm* — Nixon & Vanderhye P.C.

(57) ABSTRACT

The invention relates to a technique of performing a random access procedure over a radio interface (106) in a mobile terminal (102). A method embodiment or the random access procedure as performed in the mobile terminal comprises the steps of selecting an access time slot for transmission of an access burst (112) over the radio interface; and setting an access bandwidth for transmission of the access burst, wherein the access bandwidth is set smaller than an available transmission bandwidth associated with the radio interface.

19 Claims, 7 Drawing Sheets

OTHER PUBLICATIONS

Indonesian official action mailed Nov. 24, 2009 in corresponding Application No. W-00 2008 01239.
International Search Report for PCT/EP2006/010162 dated Feb. 16, 2007.
Written Opinion of the International Searching Authority dated Feb. 16, 2007.
International Preliminary Report on Patentability dated Feb. 12, 2008.
European Communication, Jul. 22, 2011, in corresponding European Application No. 06 806 446.8-1249.
English summary of Japanese official action, Dec. 12, 2011, in corresponding Japanese Application No. 2008-535981.
"RACH Preamble Design", 3GPP TSG RAN WG1 Meeting #42, London, UK, by Texas Instruments, Aug. 29, 2005, R1-050777.
XP50100675: "RACJ Preamble Design", by Texas Instruments, Oct. 10, 2005, R1-051058.
XP50111409: "Physical Channels and Multiplexing in Evolved UTRA Uplink", by NTT DoCoMo, Jun. 20, 2005, R1-050591.
XP50100755: "Multiplexing Method of Shared Control Channel in Uplink Single-Carrier FDMA Radio Access", Oct. 10, 2005, R1-051143.

* cited by examiner

TECHNIQUE FOR PERFORMING A RANDOM ACCESS PROCEDURE OVER A RADIO INTERFACE

This application is the U.S. national phase of International Application No. PCT/EP2006/010162 filed 20 Oct. 2006 which designated the U.S. and claims priority to Swedish Application No. 0502348-6 filed 21 Oct. 2005, the entire contents of each of which are hereby incorporated by reference.

TECHNICAL FIELD

The technology described in this application generally relates to communication interfaces of wireless networks, and in particular to air interfaces of mobile networks. More specifically, the technology described in this application relates to a technique for performing a random access procedure over a radio interface.

BACKGROUND

Today, not only mobile telephones but also other mobile terminals, such as PDAs (Personal Digital Assistants), notebooks, etc., exchange data with wireless networks via radio interfaces. Typically, a radio base station of a network serves the mobile terminal by routing data received from the terminal through the network towards the recipient, and by transmitting data received from the network side over the radio interface towards the mobile terminal.

The data may be user data such as speech data, media data, streaming data, application data etc., but may also comprise control data (signalling data) associated with, e.g., the establishment of a connection for exchanging user data. In the past, the achievable data rates for data exchange via a radio interface have steadily increased with each new generation of wireless networks. As for mobile networks, so-called $2^{nd}$ Generation or 2G systems (e.g., GSM systems) provide relatively low data rates in the order of 10 kilobytes per second (kbps), $3^{rd}$ Generation or 3G systems (e.g., UMTS systems) allow data rates of several 100 kbps and peak rates of up to a few Megabits per second (Mbps). $4^{th}$ Generation (or simply 4G) systems probably will provide data rates of several 10 Mbps with peak rates of up to 100 Mbps in the downlink (from the base station to the mobile terminal) and 50 Mbps in the uplink (from the terminal to the base station).

To achieve the high data rates of 4G systems, efficient modulation techniques will be implemented in the mobile terminals and in the base stations. Additionally, the higher data rates require a larger frequency bandwidth for each physical channel. In GSM systems, a channel bandwidth of 0.2 MHz is used. In UMTS systems, a channel bandwidth of already 5 MHz is required, and 4G systems will presumably have a bandwidth of up to 20 MHz per channel. 4G standards will allow adjusting the maximum channel transmission bandwidth in steps of (presumably) 1.25 MHz. Typical maximum channel transmission bandwidths of 4G systems may then range from 5 MHz to 20 MHz. The feature of a flexible maximum transmission bandwidth per communication system allows a smooth migration from GSM and UMTS systems to the high data rate of 4G systems, for example by re-using for 4G systems the radio frequency spectrum currently reserved for GSM and UMTS.

As an example for a 4G standard, 3GPP ($3^{rd}$ Generation Partnership Project) responsible for the UMTS standardization proposes a 4G system called LTE (Long Term Evolution) that evolves from the 3G WCDMA (Wideband-CDMA) standard. The UMTS LTE system shall be able to operate on bandwidths spanning from at least 1.25 MHz to at most 20 MHz, supporting micro cells with a radius of 10 meters and peak data rates of up to 100 Mbps therein.

The control procedures performed over the radio interface will in the future also have to take into account the features of variable bandwidth systems, i.e. that mobile terminals and radio base stations are capable of handling different bandwidths (within a maximum bandwidth typically predefined by the communications standard). One of these control procedures that will have to be adapted in this regard is the random access procedure.

A mobile terminal has to perform a random access procedure in order to get access over the radio interface to the wireless network. Prior to the random access procedure, the terminal receives data (only) from a downlink common control channel (DCCH), such a downlink control channel is, for example, the broadcast common control channel in GSM networks.

A DCCH of a base station provides information to all mobile terminals located within the radio cell served by the base station. The signalling transmitted in a DCCH typically relates to information on the actual system, on frequency synchronization, time synchronization and an estimate of the transmit power to be used by the mobile terminals. A synchronization between a mobile terminal and a radio base station has eventually to achieve bit accuracy, i.e. any transmission of the terminal during a particular time slot has to fit into the corresponding time slot at the base station such that none of the transmitted bits exceeds the base station time slot. At least at present, such an accurate time alignment cannot be achieved based only on synchronization information transmitted on the DCCH.

The random access procedure therefore allows the base station to determine the accurate time alignment by measuring the round-trip delay of information sent to the mobile terminal (e.g., in the DCCH) and transmitted back to the base station (in an access request sent by the terminal). As one result of the random access procedure, the base station may transmit a so-called "timing advance" to the terminal, which commands the terminal to shift its transmission scheme (including the timing of the time slots at the terminal) such that the transmissions arrive in the corresponding time slots at the base station with bit accuracy.

To enable the base station to measure the round-trip delay accurately enough, the terminal has to send an "access burst", which differs from a normal transmission burst by the comparatively long guard period provided to avoid an overlap of the (probably misaligned) access burst received at the base station with bursts received in the neighbouring time slots. Further, for measuring the round-trip delay the product of time length and bandwidth occupied by the access burst has to satisfy a predefined minimum value.

It is to be noted that the terminal typically provides further information with the access burst which, e.g., allows the base station to decide if it actually should grant access to the wireless network. For example, a connection setup reason may be transmitted with the access burst (e.g. 'emergency call').

The access burst is sent within a random access channel (RACH). As an example, the RACH in WCDMA systems may be sent in an arbitrary time slot and over the whole available bandwidth. As therefore the random access burst overlays with other transmissions (i.e., the RACH is non-orthogonal to other channels), an accurate control of transmit power is required. Typically, a power ramping procedure is performed, which leads to a delay of the access procedure. As a further disadvantage, the radio base station needs to continuously search for access bursts in all time slots and over the whole bandwidth supported.

In other systems, for example GSM systems, an orthogonal RACH may be provided, which may be achieved by periodically allocating a particular time slot for the random access and the entire available transmission bandwidth. To preserve orthogonality, guard periods have to be included in the time slot due to the timing uncertainties in the uplink. However, with this scheme time and frequency resources are statically assigned to the random access procedure and may only be changed by changing the allocated access time slots, e.g. their periodicity. The lengths of the reserved access time slots cannot be reduced arbitrarily, as the guard period is required, which depends on the cell size.

There is a need for a technique for performing a random access procedure over a radio interface, which allows to flexibly provide time and/or frequency resources to the random access procedure.

SUMMARY

According to a first aspect, a method of performing a random access procedure over a radio interface is proposed. The method comprises the steps of selecting an access time slot for transmission of an access burst over the radio interface, and setting an access bandwidth for transmission of the access burst. The access bandwidth is set smaller than an available transmission bandwidth associated with the radio interface.

The radio interface may be an air interface of a mobile network, for example of a 2G, 3G or 4G system. The method may be performed in a mobile terminal to achieve bit accurate synchronization with a radio base station of the communication system serving the radio interface. The RACH defined by the access time slot and the access bandwidth may be orthogonal to other channels, for example other random access channels, other control data channels or user data channels.

The available transmission bandwidth may be the frequency bandwidth supported by a radio base station for uplink transmissions. For example, the mobile network may be an LTE system, which provides a maximum available transmission bandwidth of 20 MHz for uplink transmissions from mobile terminals. In an alternative implementation of an LTE network, the radio base station may support only a portion of the LTE maximum transmission bandwidth, for example 5 MHz. Information regarding at least one of the available transmission bandwidth, the access bandwidth and the location of an access frequency band having the access bandwidth may be received by the mobile terminal for example via a DCCH or other transmission channel, via a data carrier such as SIM (Subscriber Identity Module) card, or in any other way.

In some non-limiting, example implementations, the access bandwidth may be set according to a minimum access bandwidth. The access bandwidth may for example be set equal to or higher than the minimum access bandwidth. The minimum bandwidth may be determined by resource (e.g. time or frequency) synchronisation requirements of the radio interface. For bit accurate synchronization of the mobile terminal with the radio base station for example, the base station has to exactly determine the round-trip delay. This requires the access burst to conform to a minimum value of the product of time length and bandwidth of the access burst. For a given time length of the access burst, the minimum access bandwidth can be determined. The minimum access bandwidth may be known to the terminal in advance or may be calculated either by the terminal or the base station and/or may be announced in a downlink control channel.

The minimum access bandwidth may alternatively or additionally be chosen such that it corresponds to a minimum system bandwidth which a base station and/or a mobile terminal have/has at least to support for a channel according to a particular communication standard. For example, the minimum system bandwidth may be standardized as being 1.25 MHz. It is to be noted, however, that the access bandwidth for transmission of the access burst may also be set to a value which is lower than a minimum system bandwidth. For example, in small cells a bit accurate timing alignment may be achieved with a smaller access bandwidth than a standardized minimum system bandwidth.

In one non-limiting, example variant, the particular access time slot may be selected out of a periodic arrangement of access time slots associated with the radio interface. The periodic arrangement may be known to the mobile terminal in advance or may be announced by the radio base station over the radio interface, for example in the DCCH. For example, the RACH may be associated with a particular time slot in a frame or in a multi-frame comprising a predetermined number of time slots.

Some non-limiting, example implementations may comprise the further step of selecting an access frequency band having the access bandwidth within the available transmission bandwidth. The access frequency band may, for example, be selected in accordance with a frequency multiplexing scheme associated with the radio interface. For instance, the available transmission bandwidth associated with the radio interface may be 5 MHz. Within this bandwidth, four orthogonal channels having a bandwidth of 1.25 MHz each may be provided. The mobile terminal may then select one of these bands for transmitting its access burst. A particular pair of access time slot and access frequency band may then carry a random access channel or any other data channel, therefore such a pair will also be briefly termed a "channel" in the following.

An access frequency band may alternatively, or additionally, be selected in accordance with a frequency hopping pattern associated with the radio interface. In the case that there exist several bands defined within the access time slot, the frequency hopping pattern may, for example, comprise assigning the first, second, third, etc. band to a RACH in consecutive or any other order. Such a hopping pattern may be known to the mobile terminal in advance, or the pattern may be indicated in a downlink control channel by the radio base station to the served cell.

In some non-limiting, example implementations, the method may comprise the step of transmitting two access bursts in different access frequency bands. The access bursts may be transmitted in the same or in different time slots. In the former case a mobile terminal performing the method may comprise two transmitters.

In one non-limiting, example variant, at least one of the access time slot and the access frequency band may be determined according to a priority scheme associated with the radio interface. For example, particular access channels may be provided for high priority mobile terminals and other channels for low priority terminals. For example, the number of users assigned to a high-priority RACH may be made smaller than the number of users assigned to low-priority RACH.

According to a second aspect, a method of providing a random access channel for a radio interface is proposed. The method comprises the steps of defining an access time slot for the random access channel; and setting an access bandwidth for an access request. The access bandwidth is set smaller than an available (or supported) transmission bandwidth associated with the radio interface.

The step of setting the access bandwidth may comprise setting the access bandwidth for an access filter, the access filter being applied during the access time slot to receive an access burst.

The method may be performed in a radio base station serving the radio interface, for example a base transceiver station in a GSM network or a Node-B in the RAN of an UMTS system. The available transmission bandwidth supported by the base station conforms to a predefined maximum transmission bandwidth conforming to a communications standard or a portion of that maximum transmission bandwidth. For example, the base station may provide a maximum of 20 MHz in a 4G system, or may comprise a portion of the maximum transmission bandwidth, for example 5 MHz. The available transmission bandwidth may not be smaller than prescribed by a communications standard. For example, in 4G systems a minimum system transmission bandwidth will probably be 1.25 MHz, such that a base station may provide at least an available transmission bandwidth of 1.25 MHz.

The access bandwidth may be set according to a predefined minimum access bandwidth defined, for example, by synchronization requirements as described above. For bit accurate synchronization, and predetermined access burst time lengths, a minimum access burst bandwidth is required. In some implementations, this minimum access bandwidth may be used as access bandwidth for the access filter for receiving access burst.

Some non-limiting, example implementations of the second aspect may comprise the further step of setting the access bandwidth according to an access frequency band having the access bandwidth. For example, a frequency hopping scheme may be implemented, according to which a particular frequency band is assigned to consecutive access time slots.

Further non-limiting, example implementations may comprise the additional step of applying one or more further filters to receive other data during the access time slot. These filters may comprise further access filters, such that two or more random access channels can be provided within a single access time slot. The filters may additionally or alternatively comprise filters adapted for the reception of control data (signalling data) and/or user data. Such data may be received from the same or different mobile terminals.

In one non-limiting, example variant, the method comprises the further step of transmitting information relating to at least one of the access bandwidth, access time slot and access frequency band over the radio interface. The information may be transmitted in a DCCH. Mobile terminals located within the cell for which this information is transmitted may use this information to prepare for transmitting an access burst.

According to a further aspect, a computer program product is proposed, which comprises program code portions for performing the steps of any one of the methods described herein when the computer program product is executed on one or more computing devices, for example a mobile terminal or a radio base station of a wireless network. The computer program product may be stored on a computer readable recording medium, such as a CD-ROM or DVD. Additionally or alternatively, the computer program product may be provided for download by a download server. The downloading may be achieved, for example, via the Internet.

According to a further aspect, a mobile terminal is provided, which is adapted for performing a random access procedure over a radio interface. The device comprises a time slot component adapted for selecting an access time slot for transmission of an access burst over the radio interface; and a bandwidth component adapted for setting an access bandwidth for transmission of the access burst. The bandwidth component is adapted for setting the access bandwidth smaller than an available transmission bandwidth associated with the radio interface.

According to a still further aspect, a radio base station is proposed, which is adapted for providing a random access channel for a radio interface. The radio base station comprises a time slot component adapted for defining an access time slot for the random access channel; and a bandwidth component adapted for setting an access bandwidth for an access request. The bandwidth component is adapted for setting the access bandwidth smaller than an available transmission bandwidth associated with the radio interface.

The bandwidth component may be adapted for setting the access bandwidth for an access filter, the access filter being applied during the access time slot to receive an access burst. The bandwidth component may be adapted for providing multiple access filters in different frequency bands for the access time slot. In this way, the base station may provide several access channels orthogonal in frequency in the same time slot which may be used by one and the same mobile device or several mobile devices.

DETAILED DESCRIPTION

In the following description, for purposes of explanation and not limitation, specific details are set forth, such as specific network types including particular network nodes, communication protocols etc. It will be apparent to one skilled in the art that other embodiments that depart from these specific details may be practiced. For example, the skilled artisan will appreciate that the technology described in this application may be practiced with wireless networks different from the mobile network discussed below. Rather, the technology described in this application may be practiced with any wireless network in which a random access procedure is performed over the radio interface. This may include for example HIPERLAN networks (HIPERLAN is a standard for wireless local area networks).

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that a described method may also be embodied in a computer processor and a memory coupled to a processor, wherein the memory is encoded with one or more programs that perform one or more of the methods disclosed herein when executed by the processor.

Figure 1:
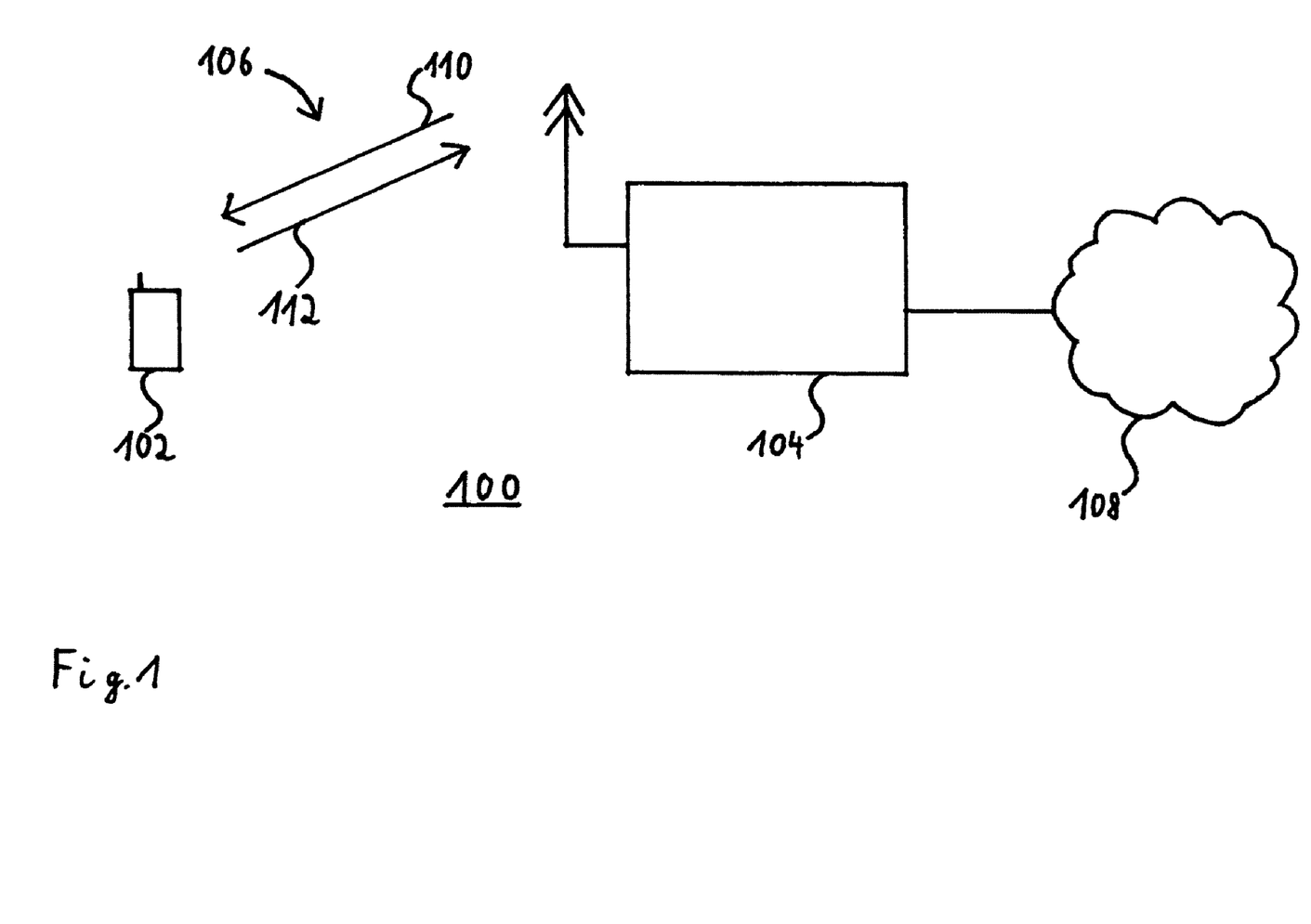
FIG. 1 is a schematic illustration of a non-limiting, example embodiment of a communication system.

FIG. 1 schematically illustrates a communication system 100 including a mobile terminal 102 and a radio base station 104, which are configured to exchange data via a radio interface 106. The base station 104 belongs to a mobile network 108.

To be able to set up a connection to another termination point (e.g. a fixed or mobile user, a data provisioning server, etc.) the mobile terminal 102 has to get access via the base station 104 to the network 108. To this end, amongst others a random access procedure has to be performed in each of the terminal 102 and the base station 104. For preparing the procedure, the terminal 102 listens to a downlink control channel (DCCH) 110, which is transmitted (e.g., broadcasted) by the base station 104 into the radio cell (not shown) served by the base station 104. The DCCH may announce, for example, cell ID and network ID, random access parameters, channel configurations such as transmission schemes and parameters for connection setup.

Based on the broadcasted information, the mobile terminal 102 is able to perform a random access procedure, in which one or more access requests each including an access burst 112 are transmitted over the air interface 106 to the base station 104. The base station 104 analyzes the access burst 112 and determines the timing advance value and possibly also the frequency difference between mobile terminal 102 and base station 104, which then are sent to the terminal 102 for synchronization purposes. Based on further information provided in the access request (i.e. encoded within the access burst), the base station 104 decides to grant or to deny the terminal 102 access to the mobile network 108. The configuration of the access burst 112 as well as transmission schemes which may be used by terminal 102 and base station 104 for transmitting and receiving the access burst, respectively, will be described in more detail in the following.

Figure 2:
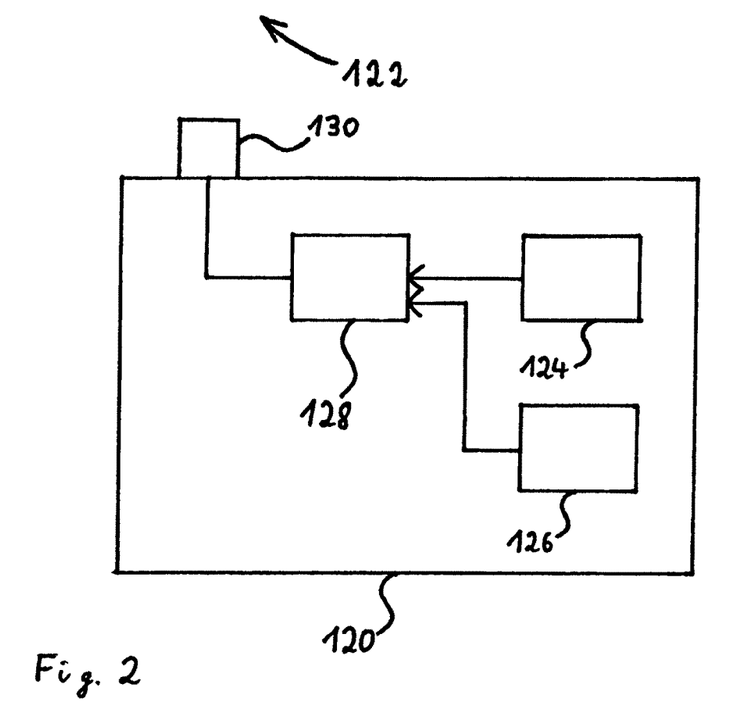
FIG. 2 is a functional block diagram schematically illustrating a non-limiting, example embodiment of a mobile terminal.

FIG. 2 schematically illustrates functional components of a mobile terminal 120, which is adapted for performing a random access procedure over a radio interface 122. The terminal 120 may be an implementation of terminal 102 in FIG. 1.

The mobile terminal 120 comprises a time slot component 124, which is adapted for selecting an access time slot for transmission of an access burst over the radio interface 122. The terminal 120 further comprises a bandwidth component 126 adapted for setting an access bandwidth for transmission of the access burst. Both components 124 and 126 may be triggered by a control component (not shown) controlling the random access procedure. The bandwidth component 126 is further adapted for setting the access bandwidth smaller than an available transmission bandwidth associated with the radio interface. The bandwidth component 126 may in addition be adapted to set the access bandwidth equal to the available transmission bandwidth. At least one of the access bandwidth, available bandwidth and the location of an access frequency band within the available bandwidth may be known in advance to the terminal 120. For example, corresponding parameters may be stored in a user card such as a SIM card or USIM card (USIM: UMTS Subscriber Identity Module), which is provided to the user of the terminal 120 from a network operator. Alternatively, the available transmission bandwidth provided by a radio base station serving the radio interface and/or the applicable frequency band and/or the access bandwidth may have been announced in a DCCH as illustrated in FIG. 1. The access bandwidth and/or the applicable access frequency band set by the bandwidth component 126 may have also been announced to the terminal 120, e.g. via the radio interface 122. Alternatively, the bandwidth component 126 may decide on the access bandwidth on the basis of other information. For example, the bandwidth component may set the access bandwidth to a minimum bandwidth as determined by the communications standard according to which the random access procedure is performed.

The components 124 and 126 provide their parameter settings to a transmission component 128, which is coupled to an antenna 130 and operates according to the provided settings, such that the access burst is transmitted in the desired access time slot and with the desired access bandwidth.

Figure 3:
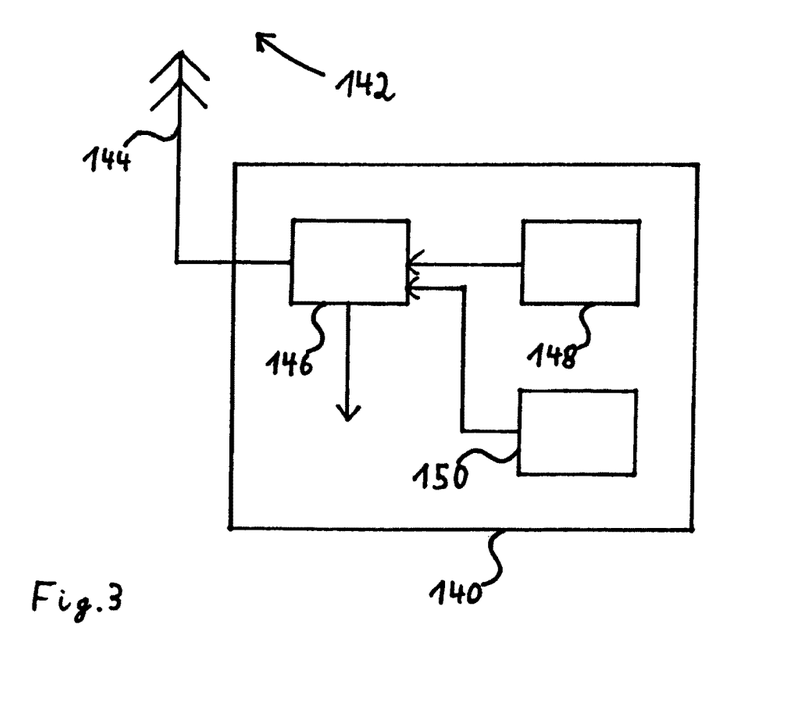
FIG. 3 is a functional block diagram schematically illustrating a non-limiting, example embodiment of a radio base station.

FIG. 3 schematically illustrates an embodiment of a radio base station 140, which is adapted for providing a random access channel for a radio interface 142. The base station 140 may be an implementation of the base station 104 of FIG. 1. The radio interface 142 may be, for example, the interface 122 of FIG. 2.

The base station 140 comprises an antenna 144 for receiving radio signals transmitted over the radio interface 142. The received signals are provided to a reception component 146, which may, for example convert the received signal from a radio frequency range into an internal frequency range used by further signal processing components (not shown) of the base station 140 and may apply filters for filtering of the received signal.

The base station 140 further comprises a time slot component 148, which is adapted for defining an access time slot for the random access channel. Further, a bandwidth component 150 is provided, which is adapted for setting an access bandwidth for an access request. The components 148 and 150 provide control signals to the reception component 146. The reception component 146 applies during the access time slot an access filter configured according to the control signals to the received radio signal and may in this way recover an access burst transmitted over the radio interface 142 within the access time slot and within the access frequency band.

The recovered access burst is provided by the reception component 146 to further components (not shown) of the base station 140, which analyse the identified access burst and detect further information. For example, the access burst may comprise a random reference for communication with the transmitting mobile terminal as well as information related to a connection setup request of the terminal.

The bandwidth component 150 is adapted for setting the access bandwidth smaller than an available transmission bandwidth associated with the radio interface 142. The bandwidth component 150 may in addition be adapted for setting the access bandwidth equal to the available transmission bandwidth. For example, the base station 140 may be adapted for providing the entire transmission frequency bandwidth for the radio interface of a particular communication standard to which the base station conforms. Accordingly, the base station 140 may make a bandwidth of 20 MHz available when conforming to the 3GGP LTE standard. Instead of being prepared to receive access bursts over the entire available transmission bandwidth, the bandwidth component 150 may set the access bandwidth to a smaller value, such that only a fraction of the available transmission bandwidth may be used for receiving access bursts. For example, the access bandwidth may be set to the minimum system bandwidth which has to be supported by equipment conforming to the 3GGP LTE standard, i.e. 1.25 MHz.

Figure 4:
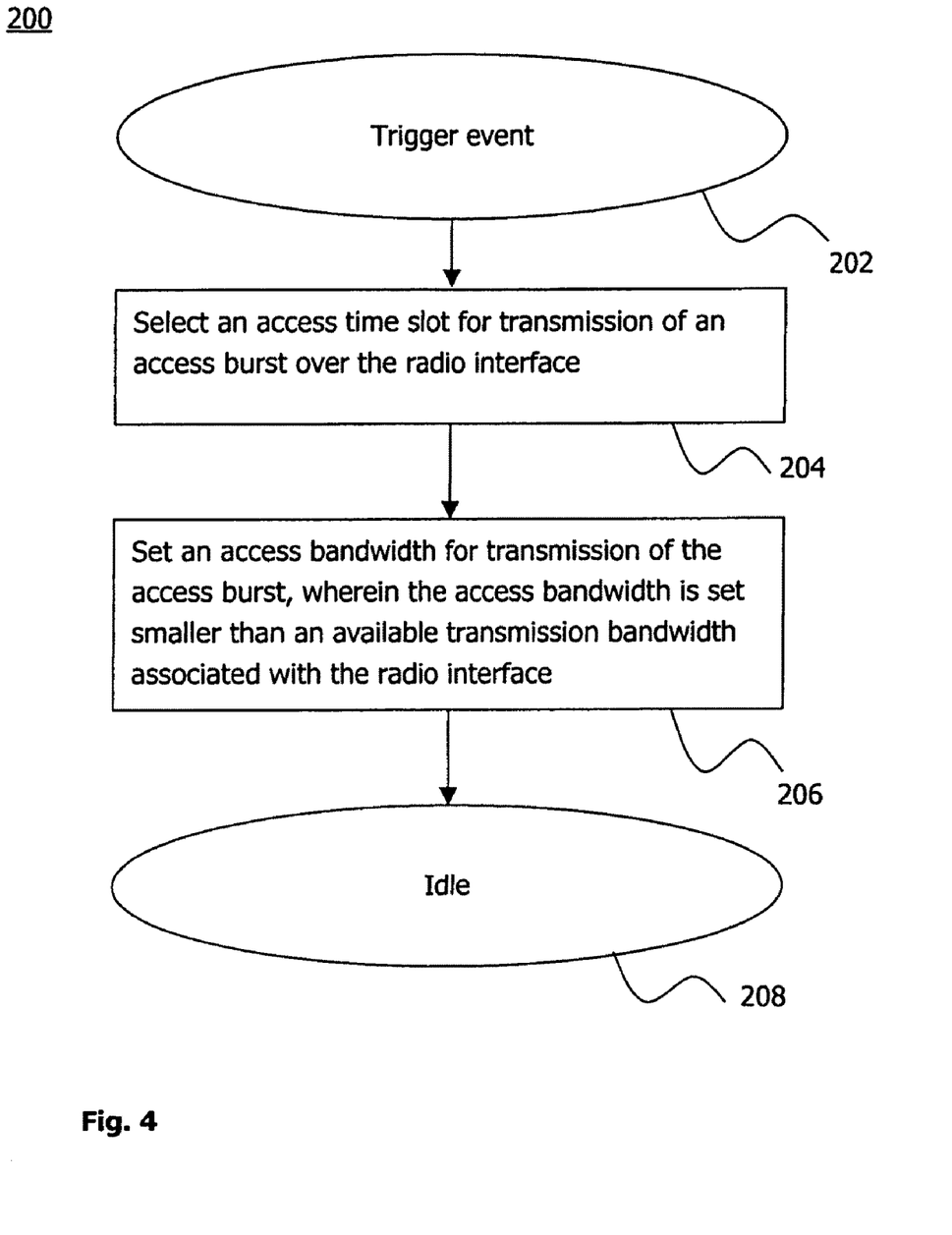
FIG. 4 is a flow diagram schematically illustrating steps of a non-limiting, example embodiment of a method for performing a random access procedure in a mobile terminal.

FIG. 4 schematically illustrates steps of an example embodiment of a method 200 for performing a random access procedure over a radio interface. The method embodiment may be performed for example by one of the mobile terminals 102 or 120.

The procedure is triggered in step 202, for example by a signal from a control component which controls a random access procedure. In step 204, an access time slot for transmission of an access burst over the radio interface is selected. In step 206, an access bandwidth for transmission of the access burst is set, wherein the access bandwidth is set smaller than an available transmission bandwidth associated with the radio interface. The procedure ends in step 208. It is to be noted that steps 204 and 206 may also be performed in parallel or may be performed in different order.

Figure 5:
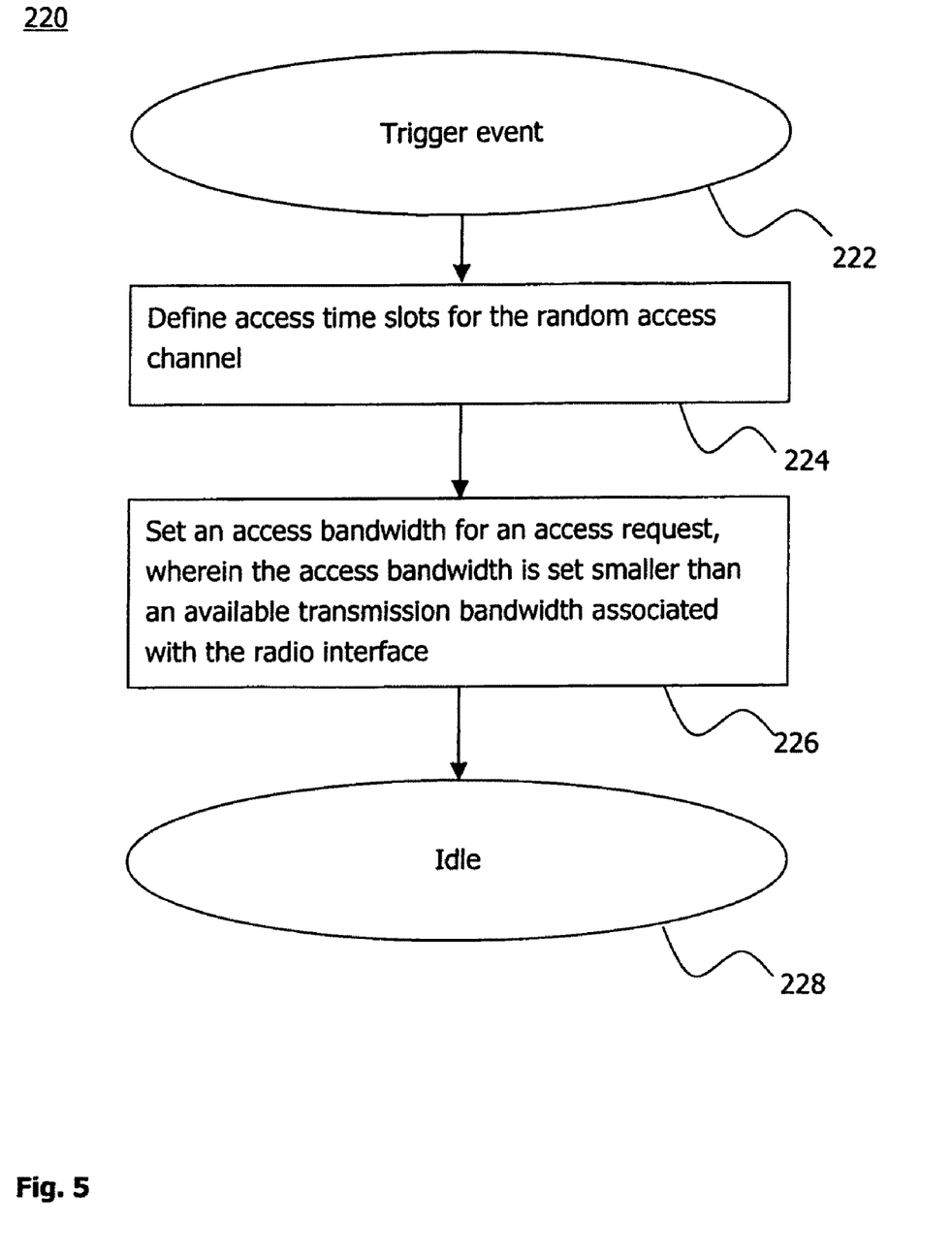
FIG. 5 is a flow diagram schematically illustrating a non-limiting, example embodiment of a method for performing a random access procedure in a base station.

FIG. 5 schematically illustrates an example embodiment of a method 220 for providing a random access channel for a radio interface. The method may be performed in one of the radio base stations 104 or 140.

The procedure is triggered in step 222, for example by a trigger signal from a control component for controlling a reception of access bursts. In step 224, access time slots for the random access channel are defined. In step 226, an access bandwidth for an access request is set, wherein the access bandwidth is set smaller than an available transmission bandwidth associated with the radio interface. For example, the access bandwidth may be set for an access filter, which is applied during the access time slot to receive an access burst. The method ends in step 228. It is to be noted that steps 224 and 226 may alternatively be performed in parallel or in different order.

Figure 6:
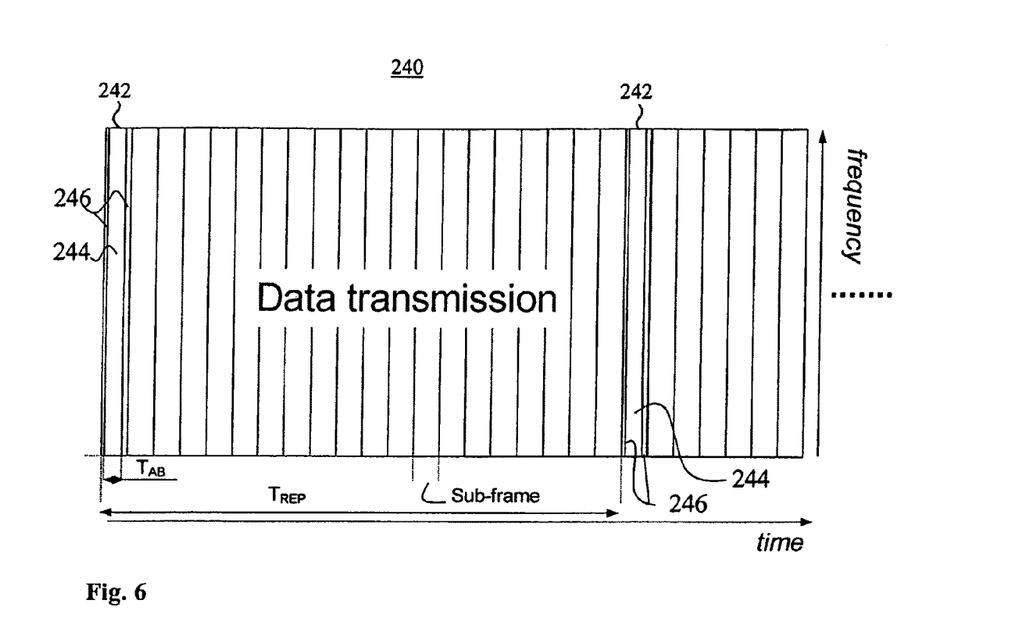
FIG. 6 schematically illustrates a prior art implementation of a data transmission scheme.

FIG. 6 schematically illustrates a prior art implementation of a data transmission scheme 240 concerning in particular the transmission of access bursts. The scheme is given in the form of a time vs. frequency diagram. Sub-frames indicate time slots. Particular time slots 242 are designated as access time slots. In the particular embodiments a random access channel (RACH) occupies in an access time slot 242 the entire bandwidth available over the radio interface.

Within an access time slot 242 an access burst 244 may be transmitted having an access burst time length $T_{AB}$. Additional guard periods 246 are required within the access time slot 242 due to the timing uncertainties in the uplink. More precisely, in order to maintain orthogonality between access bursts and other data transmitted in further time slots, the access bursts have to arrive at a certain time instance at the radio base station. As the synchronization achieved prior to the random access procedure does not take into account roundtrip propagation times, there is an uncertainty arising for example from the unknown distance between base station and mobile terminal. In order to allow for this uncertainty, the guard periods 246 have to be introduced. The access time slot length $T_{RACH}$ therefore includes $T_{AB}$ as well as the guard periods. The access time slots may periodically follow each other with a repetition period of $T_{REP}$.

Figure 7:
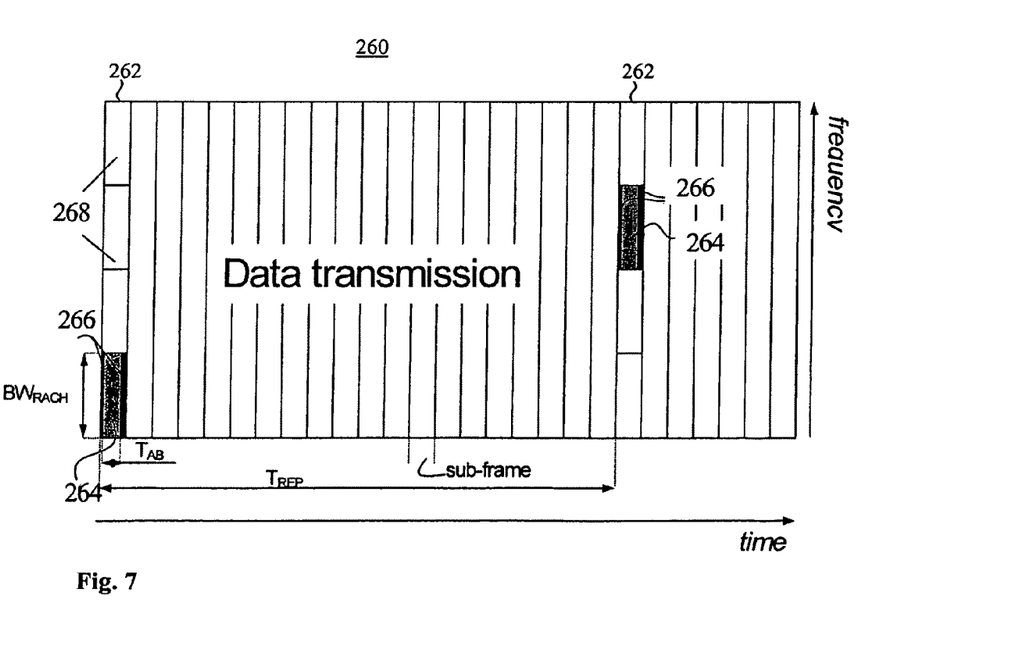
FIG. 7 schematically illustrates a second non-limiting, example embodiment of a data transmission scheme.

FIG. 7 schematically illustrates a first non-limiting, example embodiment of a data transmission scheme 270. As in FIG. 6, each access time slot 262 may include access bursts 264 with time length $T_{AB}$ and guard periods 266. In the implementation shown in FIG. 7, within each of the access time slots 262 only a fraction $BW_{RACH}$ of the totally available transmission bandwidth is allocated for an access channel. In the example of FIG. 7, the bandwidth $BW_{RACH}$ occupies one fourth of the available bandwidth, such that three further channels 268 are defined.

In general it is possible to have several allowed access bandwidths for a particular communication system, such that the mobile terminal (or the serving base station) may decide for a particular of the allowed access bandwidths. In a case as illustrated in FIG. 7, in which only a single access bandwidth $BW_{RACH}$ is specified, the access bandwidth might be chosen such that it fits into a minimum system bandwidth specified by the telecommunications standard, i.e. the access bandwidth might be chosen to be smaller or equal to the minimum system bandwidth. In one example, the minimum system bandwidth may be defined to be 1.25 MHz and $BW_{RACH}$ may then be selected as 1.25 MHz. Using such a single access bandwidth enables to simplify the configuration of base station and/or terminals.

In other embodiments, in which $BW_{RACH}$ is chosen larger than the minimum system bandwidth, multiple random access procedures may be specified, one procedure for each access bandwidth. If in this case, for example, a mobile terminal supports only one access bandwidth, it may not be able to access a radio base station. Accessibility will only be assured if the base station is equipped with multiple random access receivers, one receiver for each of the allowed access bandwidths.

In still other embodiments, a mobile terminal may be adapted to choose from different access bandwidths. For example, the terminal might be adapted to either use a $BW_{RACH}$ equal to the available bandwidth or a $BW_{RACH}$ equal to a smaller value, e.g. a minimum system bandwidth.

In any case, it has to be ensured that the access bandwidth is sufficient to enable the base station to measure the timing advance value with bit accuracy. Typically, for a 3GPP LTE system, an access bandwidth chosen at or slightly below a minimum system bandwidth of 1.25 MHz will meet this condition.

Referring again to FIG. 7, the access time slots 262 repeat with a time period $T_{REP}$. The value of $T_{REP}$ may be fixed, for example by a telecommunications standard. In other embodiments, the radio base station or other control nodes of a wireless network may set the periodicity, for example according to the requirement to provide sufficient resources for random access procedures. The momentarily valid value of $T_{REP}$ may then be announced by higher layer signalling. The access time slot length may also either be known in advance in the mobile terminal or may be signalled.

The value of $T_{REP}$ related to the periodicity of the random access time slots may, as an example, be chosen in the range of 10 milliseconds (msec). An access slot may have the same length $T_{RACH}$ as other time slots, for example 0.5 msec or 1 msec. The length $T_{AB}$ of a random access burst may fit into the access time slot, such that a sufficient guard time period is left to allow for the timing uncertainty. $T_{AB}$ may for example be 400 microseconds (μs) and the guard period may be 100 μs. Another example would be a $T_{AB}$ of 900 μs with a guard period of 100 μs. These values are appropriate, for example, for cell sizes of up to approximately 15 kilometres. For larger cells either the random access slot length $T_{RACH}$ may be enlarged such that it is, e.g., approximately twice the length of other time slots, or the network (the base station) may ensure that no uplink data transmissions are scheduled in the sub-frame following the random access time slot. In this case, large cell sizes may be handled without any further re-configuration requirements.

The bandwidth allocated for a random access burst, $BW_{RACH}$, may be in the order of 1 MHz, which is typically large enough to enable a sufficient timing resolution. Note that this value is smaller than the smallest allowed system bandwidth suggested for example for 3GGP LTE, which is prospectively 1.25 MHz. In this way, for a system providing an available transmission bandwidth of 5 MHz, up to 4 or even 5 parallel random access channels may be allocated, each occupying a different frequency band within the random access time slot.

The scheme 260 further illustrates that frequency hopping may be applied for consecutive access time slots 262, i.e. different frequency bands may be used in consecutive time slots. In the example of FIG. 7, the RACH occupies in consecutive access time slots 262 alternately the first and the third of the frequency bands 268. In other embodiments another periodicity may be prescribed, for example all available frequency bands may be used. In each of the access time slots 262, the frequency bands 268 not being occupied by the RACH may be used for transmissions of other data, for example control or user data.

Figure 8A:
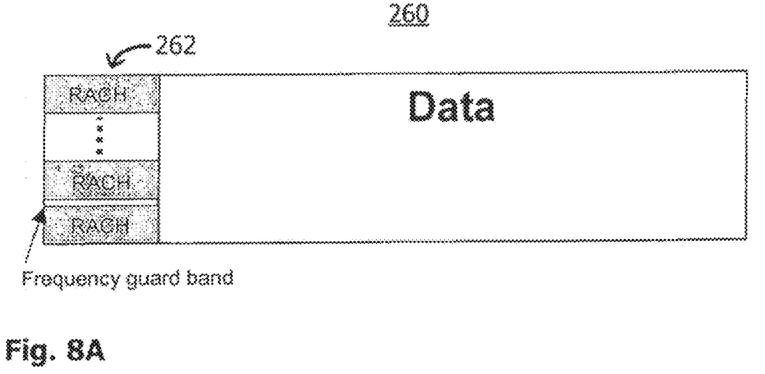
FIGS. 8A-C schematically illustrate third to fifth non-limiting, example embodiments of data transmission schemes.
Figure 8B:
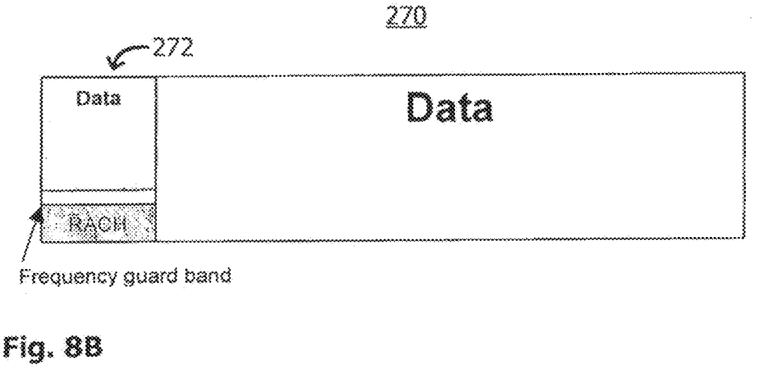
Figure 8C:
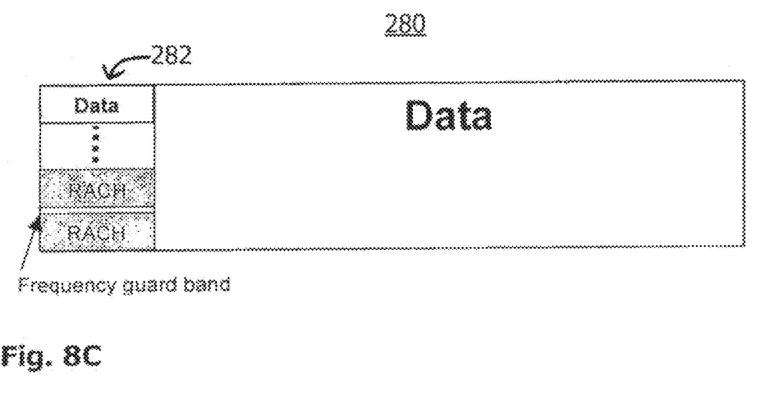

This is illustrated in FIGS. 8A-8C showing further embodiments of transmission schemes 260, 270 and 280 similar to FIG. 7. Only a single access time slot 262, 272 and 282, respectively, is illustrated in more detail.

In each of the transmission schemes 260, 270 and 280, the access bandwidth for a random access channel RACH is set smaller than the available transmission bandwidth associated with the radio interface. In scheme 260, the remaining bandwidth is used for further random access channels RACH. The individual channels are separated from each other by frequency guard bands to avoid an overlap of inaccurately positioned access bursts received at the base station in neighbouring channels. In this way, a number of frequency-multiplexed, orthogonal access channels can be provided within the available transmission bandwidth. The channels may be used for one or more mobile terminals, e.g. a single terminal may transmit two access bursts in different frequency bands.

In transmission scheme 270, the available bandwidth not used for the RACH is used for the transmission of other data instead, for example user data and/or control data. Transmission scheme 280 is a combination of schemes 270 and 260. Two access channels are provided within the access time slot 282, and the remaining available bandwidth is used for transmission of other data. In other embodiments, the frequency bands used for RACH bursts and the frequency bands allocated to transmission of other data may be positioned in an interleaving or alternating pattern.

Figure 9:
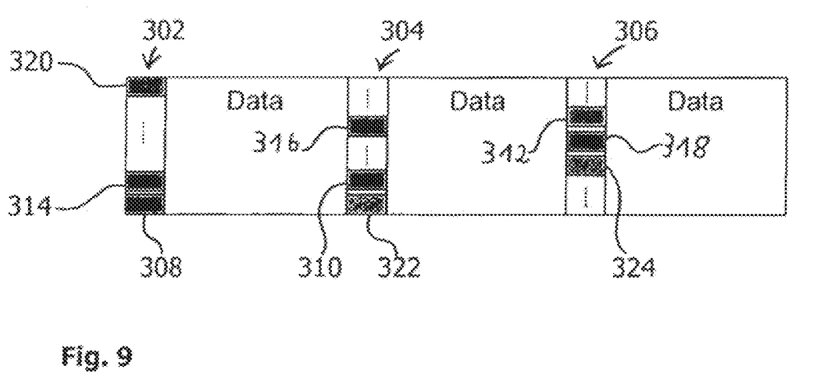
FIG. 9 schematically illustrates a sixth non-limiting, example embodiment of a data transmission scheme.

FIG. 9 schematically illustrates a further embodiment of a transmission scheme 300. In FIG. 9, the configuration of access time slots 302, 304 and 306 with various access frequency bands 308-324 is illustrated in a similar manner as in the FIGS. 7 and 8.

Transmission scheme 300 illustrates the possibility to assign users to different random access user groups. For example, a first group of users may be assigned to random access channels 308, 310 and 312. A second group of users may be assigned to the access channels 314, 316 and 318, whereas a third user group may be assigned to access channels 320, 322 and 324. A particular frequency hopping pattern is applied to the RACHs of each of the user groups. In other embodiments, a constant frequency band may be allocated for a particular user group or for all user groups. However, the use of a frequency hopping pattern is beneficial from a diversity perspective. At low mobile terminal speeds, a particular frequency can be subject to a fading dip extending over multiple access slots. If the first access attempt was unsuccessful, it may thus be beneficial to use another frequency for a subsequent attempt. The frequency hopping patterns exemplarily illustrated for the user groups in the scheme 300 of FIG. 9 increase the diversity for re-transmissions of the random access requests, such that in subsequent access slots other frequency bands are available for a random access procedure.

A frequency hopping pattern may be known to the mobile terminals in advance, or may be signalled to the mobile terminals such that each terminal knows which frequency to use in which access slot. In case the hopping pattern is known to both the mobile terminal and the radio base station, the latter can configure its random access receiver appropriately. Alternatively, a mobile terminal may randomly select one of the provided RACH frequency bands for its random access procedure. This requires that the radio base station searches all the frequency bands assigned to RACH bursts during the access time slot.

In another embodiment, the different user groups which are exemplarily illustrated in FIG. 9 may be assigned different priority classes. In this way high priority terminals or high priority users may be separated from low priority terminals or low priority users in the frequency domain. For example, the number of users assigned to a particular user group may be lower for a high priority class and higher for a low priority class. In this way, the risk of collisions in the access channels assigned to a high priority class may be reduced and thus a random access procedure will on the average perform faster (due to a reduced delay resulting from additional attempts in case of collisions). Additionally or alternatively, high priority user classes may also be assigned more than one access channel per access time slot and/or a higher number of access time slots in a frame or multi-frame. For example, a RACH for low priority users may only be provided in every second consecutive access time slot.

Figure 10:
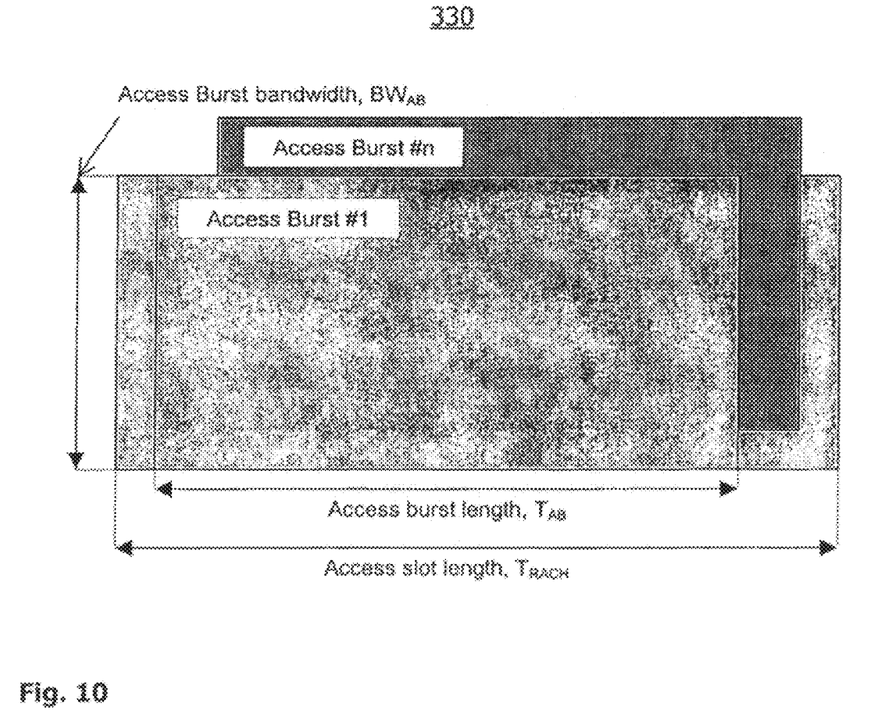
FIG. 10 schematically illustrates a seventh non-limiting, example embodiment of a data transmission scheme.

FIG. 10 illustrates a further embodiment of a data transmission scheme 330. A particular RACH using a single access frequency band during a particular access time slot is illustrated only. The RACH may be used by multiple mobile terminals 1 . . . n transmitting their access bursts in a code-multiplexed way (CDMA, Code Division Multiple Access). The access bursts may be separated from each other by coding them with different, orthogonal codes. A code set comprising a limited number of orthogonal codes may be known in advance to the mobile terminals or an indication of such a code set may be signalled, for example in a downlink control channel. The access bursts from different terminals may then disturb each other in power, but are still separable in the base station due to the different coding. A mobile terminal may randomly choose one code from the code set. The technique illustrated in FIG. 10 may be used in conjunction with the techniques in FIGS. 7-9.

The technique proposed herein allows to provide resources for random access requests of mobile terminals in a flexible way. Due to the fact that only a portion of the available transmission bandwidth at a radio interface is used for a particular access burst during the access time slot, the remaining available bandwidth can be used either for further access bursts or for the transmission of other data. The usage of the access bandwidth, and its location within the available transmission bandwidth, in the access time slot may be signalled to the terminals inside the cell served by the base station such that resources may be provided on a short time scale and in an automatic way. A waste of bandwidth resources for the random access procedure is therefore avoided. In case a particular access bandwidth is prescribed for a communication system, the design of random access transmitters and receivers is facilitated. The number of random access channels may additionally be adjusted in the code domain. Frequency diversity can easily be achieved by applying a frequency hopping pattern for consecutive access time slots/access frequency bands.

The technology described in this application has been described in relation to non-limiting, example embodiments, which are understood to be for illustrative purposes only. Accordingly, it is intended that the invention be limited only by the scope of the claims appended hereto.

The invention claimed is:

1. A method in a mobile terminal of performing a random access procedure over a radio interface, the method comprising:
   selecting an access time slot for transmission of an access burst over the radio interface; and
   setting one of a first access bandwidth or a second access bandwidth for a transmission channel for transmission of the access burst,
   wherein the set access bandwidth of the transmission channel is set smaller than an available system transmission bandwidth for uplink channels associated with the radio interface, and
   wherein the set access bandwidth corresponds to an access bandwidth for an access filter applied in a base station during the access time slot to receive the access burst.

2. The method according to claim 1, further comprising receiving information concerning at least one of the available system transmission bandwidth, the set access bandwidth, and a location of an access frequency band having the set access bandwidth.

3. The method according to claim 1, wherein the set access bandwidth is set according to a minimum access bandwidth.

4. The method according to claim 1, wherein the access time slot is selected out of a periodic arrangement of access time slots associated with the radio interface.

5. The method according to claim 1, comprising the further step of selecting an access frequency band of the transmission channel having the set access bandwidth within the available system transmission bandwidth.

6. The method according to claim 5, wherein the access frequency band is selected according to a frequency multiplexing scheme associated with the radio interface.

7. The method according to claim 6, wherein the access frequency band is selected according to a frequency hopping pattern associated with the radio interface.

8. The method according to claim 5, comprising the step of transmitting two or more access bursts in different access frequency bands.

9. The method according to claim 1, wherein at least one of the access time slot and the access frequency band is determined according to a priority scheme associated with the radio interface.

10. A method in a base station of providing a random access channel for a radio interface, the method comprising:
    defining access time slots for the random access channel;
    setting a first access bandwidth for a first access request channel or a second access bandwidth for a second access request channel; and
    selecting the first access request channel or the second access request channel for reception of an access burst, wherein the access bandwidth of the selected access request channel is set smaller than an available system transmission bandwidth for uplink transmission channels associated with the radio interface, and
    applying an access filter, having an access bandwidth of the selected access request channel, during the access time slot to receive the access burst.

11. The method according to claim 10, wherein the access bandwidth of the selected access request channel is set according to a predefined minimum access bandwidth.

12. The method according to claim 10, further comprising setting the access bandwidth of the selected access request channel according to an access frequency band having the access bandwidth.

13. The method according to claim 10, further comprising applying one or more further filters to receive further data during the access time slot.

14. The method according to claim 10, further comprising transmitting information relating to at least one of the access bandwidth, access time slot, and access frequency band over the radio interface.

15. A non-transistors computer program product comprising program code portions for performing the method of claim 1 when the computer program product is executed on one or more computing devices.

16. The non-transistors computer program product of claim 15, stored on a computer readable recording medium.

17. A mobile terminal for performing a random access procedure over a radio interface, the terminal comprising:
    a time slot component configured to select an access time slot for transmission of an access burst over the radio interface; and
    a bandwidth component configured to set one of a first access bandwidth or a second access bandwidth for a transmission channel for transmission of the access burst,
    wherein the set bandwidth component is configured to set the access bandwidth of the transmission channel smaller than an available system transmission bandwidth for uplink channel transmissions associated with the radio interface, and
    wherein the set access bandwidth corresponds to an access bandwidth for an access filter applied in a base station during the access time slot to receive the access burst.

18. A radio base station for providing a random access channel for a radio interface, the radio base station comprising:
    a time slot component configured to define an access time slot for the random access channel;
    a bandwidth component configured to set a first access bandwidth for a first access request channel or a second access bandwidth for a second access request channel; and
    an access filter configured to filter an access burst received during the access time slot, the access filter having a bandwidth corresponding to the first access bandwidth or the second access bandwidth,
    wherein the access filter bandwidth is smaller than an available system transmission bandwidth for uplink channel transmissions associated with the radio interface.

19. The radio base station according to claim 18, wherein the bandwidth component is configured to provide multiple access filters in different frequency bands for the access time slot.

* * * * *

UNITED STATES PATENT AND TRADEMARK OFFICE
CERTIFICATE OF CORRECTION

PATENT NO. : 8,285,294 B2
APPLICATION NO. : 12/083911
DATED : October 9, 2012
INVENTOR(S) : Baldemair et al.

It is certified that error appears in the above-identified patent and that said Letters Patent is hereby corrected as shown below:

In the Specification

In Column 2, Line 17, delete "(DCCH)," and insert -- (DCCH); --, therefor.

In the Claims

In Column 13, Line 65, in Claim 10, delete "is set" and insert -- is --, therefor.

In Column 14, Line 20, in Claim 15, delete "non-transistors" and insert -- non-transistory --, therefor.

In Column 14, Line 24, in Claim 16, delete "non-transistors" and insert -- non-transistory --, therefor.

Signed and Sealed this
Ninth Day of April, 2013

Teresa Stanek Rea
*Acting Director of the United States Patent and Trademark Office*